United States Patent
Frey et al.

(10) Patent No.: US 6,245,824 B1
(45) Date of Patent: Jun. 12, 2001

(54) SILICONE SURFACTANTS FOR MAKING POLYURETHANE FLEXIBLE MOLDED FOAMS

(75) Inventors: John Herbert Frey, Allentown, PA (US); David Robert Battice, Prudenville, MI (US); Allen Robert Arnold, Jr., Catasauqua, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/388,293

(22) Filed: Sep. 1, 1999

(51) Int. Cl.[7] ........................................................ C08J 9/04
(52) U.S. Cl. ...................... 521/112; 521/130; 521/131; 521/155; 521/170; 521/172; 521/174
(58) Field of Search ................................... 521/112, 130, 521/131, 155, 170, 172, 174

(56) References Cited

U.S. PATENT DOCUMENTS

| | | |
|---|---|---|
| 3,402,192 | 9/1968 | Haluska . |
| 4,031,044 | 6/1977 | Joslyn . |
| 4,139,503 | 2/1979 | Kollmeier . |
| 4,347,330 | 8/1982 | Demou . |
| 4,690,955 | 9/1987 | Kilgour et al. . |
| 5,633,292 | 5/1997 | Brüne et al. . |
| 5,830,970 | * 11/1998 | Cobb et al. ........................... 521/112 |
| 5,844,010 | 12/1998 | Burkhart et al. . |

\* cited by examiner

*Primary Examiner*—John M. Cooney, Jr.
(74) *Attorney, Agent, or Firm*—Michael Leach

(57) ABSTRACT

A method for preparing a polyurethane flexible molded by reacting an organic polyisocyanate with a polyol in the presence of urethane catalyst, water as a blowing agent, optionally a cell opener, and a silicone surfactant cell stabilizer having the formula:

$$Me_3Si(OSiMe_2)_x(OSiMeG)_yOSiMe_3$$

wherein x has an average value from 1 to 4.5 and y has an average value from 0.75 to 7.5, the value of x/y is from 0.25 to 5 and the value of x+y is from greater than 5 to 9, G is a group having the formula —D(OR")$_m$A where D is a divalent organic linking radical, R" is an alkylene group, m has an average value from 1 to 5, and A denotes an —OR'" or an —OOCR'" group, where R'" is selected from the group consisting of methyl, ethyl, and a combination of methyl and ethyl.

23 Claims, No Drawings

SILICONE SURFACTANTS FOR MAKING POLYURETHANE FLEXIBLE MOLDED FOAMS

FIELD OF THE INVENTION

The invention relates to making polyurethane flexible molded foams using particular silicone polyether copolymers as cell stabilizers. The invention affords a method for making water blown polyurethane flexible molded foams with improved bulk stability.

BACKGROUND OF THE INVENTION

Polyurethane foam production involves metering and pumping of the resin and isocyanate ingredients, which are prepared as a number of liquid components or streams, to the mixer where they are mixed thoroughly and dispensed. A typical formulation comprises two streams consisting of the isocyanate and the resin. The resin stream is a mixture of polyols, crosslinking agent such as diethanolamine (DEOA), surfactant, catalyst, water, auxiliary blowing agents, and other possible additives.

Foams demonstrating good stability also exhibit improved, isotropic physical properties, and are more easily processed with existing equipment. More specifically, molded foams with good bulk, vent, and shear stability are characterized as having small, uniform cellular structure throughout the interior of the foam. Polyurethane foams with superior surface stabilization have a layer of fine cells adjacent to the outer surface of the foam. Foams that are dimensionally stable, typically also open-celled, exhibit a reduced tendency to shrink immediately after being removed from a mold. Non-molded flexible foams require good bulk stabilization and dimensional stability, which if not present will lead to foam collapse or densification. Reduced emissions of additives in flexible foam can lead to reduced fogging on interior automobile windshields.

In the past, chemical strategies for selecting formulation variables in order to optimize the bulk, shear, vent, surface and dimensional stability have been very successful for many applications. Key variables include the judicious selection of surfactants and catalysts. The foam industry now has changed their strategy to one of maintaining foam physical properties while at the same time reducing their raw materials and/or processing costs. Approaches include reducing density by using less wet chemicals or injecting liquid carbon dioxide, lowering the amount of relatively expensive graft copolymers, using blends of TDI/MDI, and incorporating isocyanate terminated pre-polymers. All of these approaches have placed increasing challenges on the accompanying additives which could not be fully met using known prior art.

Silicone surfactants used for the production of flexible polyurethane foams are typically polydimethylsiloxanes, organofunctional polydimethylsiloxanes or siloxane polyether copolymers.

U.S. Pat. No. 3,402,192 discloses polyoxyalkylene siloxane branch copolymers useful in the preparation of polyurethane foams.

U.S. Pat. No. 4,031,044 discloses siloxane-oxyalkylene copolymer surfactants as foam stabilizers for making polyether based high resilient flexible foam. U.S. '044 teaches a very broad class of structures, but the general class that is closely related to the present invention can be described by the formula

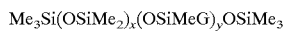

wherein G is a group having the formula —D(OR")$_m$A wherein D is a divalent linking group such as an alkylene group, R" is composed of propylene groups and groups selected from the group consisting of ethylene and butylene groups wherein the amount of ethylene and butylene is less than 35 wt % of the total (OR") group, m has an average value from 1 to 15, and A is either an —OR', —OOCR' or —OOCOOR' group where R' is a group free of aliphatic unsaturation selected from the group consisting of hydrocarbon and hydrocarbonoxy groups. When the average value of x is 0–7, then y has an average value of 1–5; when x=0, y=1–5; when x=1 or 2, then y=1–4; when x=3 or 4, then y=1–3; when x is 5, then y is 1–2; and when x is 6 or 7, then y=1. See Example 7 for specific working embodiments.

U.S. Pat. No. 4,139,503 discloses the use of specific siloxane components at 0.01 to 2 g/100 g of polyol for the production of high resilience, open celled polyurethane foam. This patent only shows examples for polydimethylsilicones.

U.S. Pat. No. 4,347,330 discloses improved high resilience open celled flexible molded polyurethane foam by incorporating three cell modifiers consisting of a polysiloxane-polyoxyalkylene copolymer, a polymethylsiloxane, and a polyether polyol cell modifier containing polyoxyethylene groups in amount of at least about 80 percent by weight of the polyether polyol.

U.S. Pat. No. 4,690,955 discloses siloxane polyether copolymer surfactants with mixed hydroxy alkoxy capping for stabilizing molded flexible foam.

U.S. Pat. No. 5,633,292 discloses a method for the production of high resilience polyurethane foams using a surfactant containing alkyl substituents rather than alkoxy substituents.

The present invention involves the use of a certain narrow class of silicone polyether copolymers belonging to a specific structure range to provide improvement in flexible polyurethane foam stability.

SUMMARY OF THE INVENTION

The invention is a method for preparing polyurethane flexible molded foam using a class of silicone polyether copolymer surfactants belonging to a specific structure range. The method comprises reacting an organic polyisocyanate and a polyol in the presence of a catalyst composition, a blowing agent, a silicone polyether copolymer surfactant cell stabilizer, and optionally a cell opening agent. Suitable silicone polyether copolymers have the formula:

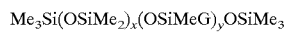

wherein x has an average value from 1 to 4.5 and y has an average value from 0.75 to 7.5, the value of x/y is from 0.25 to 5 and the value of x+y is from greater than 5 to 9, G is a group having the formula —D(OR")$_m$A where D is a divalent organic linking radical, R" is an alkylene group, m has an average value from 1 to 5, and A denotes an —OR'" or an —OOCR'" group, where R'" is selected from the group consisting of methyl, ethyl, and a combination of methyl and ethyl.

The polyurethane foam may be prepared using a conventional polyurethane flexible molded foam process or the "quasi-prepolymer" polyurethane flexible molded foam process.

Another embodiment of the invention comprises the silicone polyether surfactants of the above defined structure.

The use of these particular silicone surfactants in making polyurethane flexible molded foam affords the following advantages:

Lower use levels due to higher efficiency which will be a benefit in lower cost and emissions Maintaining bulk stability of the foam at the reduced use levels

DETAILED DESCRIPTION OF THE INVENTION

The cell stabilizers used in the preparation of the flexible molded foams comprise a silicone polyether copolymer having the formula:

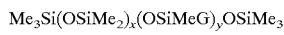

$$Me_3Si(OSiMe_2)_x(OSiMeG)_yOSiMe_3$$

wherein x has an average value from 1 to 4.5 and y has an average value from 0.75 to 7.5, the value of x/y is from 0.25 to 5, preferably 0.5 to 2, especially about 1, and the value of x+y is from greater than 5 to 9, i.e., >5 to ≦9, preferably 5.5 to 7, especially about 6. G is a group having the formula —D(OR")$_m$A where D is a divalent organic linking radical and R" is an alkylene group. The divalent organic linking radical D is exemplified by alkylene groups having from 3 to 5 carbon atoms. It is especially preferred that D is propylene. R" is an alkylene group and m has an average value from 1 to 5, preferably 2 to 3. The alkylene group R" is exemplified by ethylene, propylene, butylene, or a combination thereof, but it is especially preferred that R" is propylene. In the above formula A denotes an —OR''' group or an —OOCR''' group, where R''' is selected from the group consisting of methyl, ethyl, or a combination thereof. Preferably G is a group having the structure —CH$_2$CH$_2$CH$_2$(OCH(CH$_3$)CH$_2$)$_2$OCH$_3$.

The silicone polyether copolymer surfactants are used in an amount of 0.01 to 0.3, preferably 0.05 to 0.15, wt. parts per hundred wt. parts polyol (pphpp), most preferably about 0.075 pphpp.

These silicone polyether copolymer surfactants can be prepared according to the techniques well known in the art, for example as taught in U.S. Pat. No. 4,031,044 which is incorporated herein by reference, and can optionally, but preferably, be used in combination with other silicone surfactants well known as cell stabilizers for making polyurethane foams, such as polydimethylsiloxanes and organofunctional polydimethylsiloxanes, and other silicone polyether copolymers, and with silicone cell openers, e.g., as taught in U.S. Pat. Nos. 5,192,812 and 5,852,065 which are incorporated herein by reference. When used in such combination, the silicone cell stabilizers according to the invention may compose about 5–95 wt % of the total silicone surfactant composition.

The silicone polyether copolymer surfactants according to the invention are employed in the manufacture of polyether and polyester flexible molded polyurethane foam in the manner known to the art. In producing the polyurethane foams using these silicone surfactants, one or more polyether or polyester polyols are reacted with a polyisocyanate to provide the urethane linkage. Such polyols have an average of typically 2.0 to 3.5 hydroxyl groups per molecule.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Suitable urethane catalysts useful in the present invention are all those well known to the worker skilled in the art including tertiary amines such as triethylenediamine, N-methylimidazole, 1,2-dimethylimidazole, N-methylmorpholine, N-ethylmorpholine, triethylamine, tributylamine, pentamethyidiethylenetriamine, pentamethyidipropylenetriamine, triethanolamine, dimethylethanolamine and bisdimethylaminodiethylether, and organotins such as stannous octoate, stannous acetate, stannous oleate, stannous laurate, dibutyltin dilaurate, and other such tin salts.

Other typical agents which may be found in the polyurethane foam formulations include chain extenders such as ethylene glycol and butanediol; crosslinkers such as diethanolamine, diisopropanolamine, triethanolamine and tripropanolamine; cell openers such as silicones; and especially blowing agents such as water, liquid carbon dioxide, acetone, pentane, HFCs, HCFCs, CFCs, methylene chloride and the like.

The preferred polyurethane flexible molded foam prepared according to the invention is a high resiliency foam.

A general polyurethane flexible molded foam formulation having a 1–3 lb/ft³ (16–48 kg/m³) density (e.g., automotive seating) containing a silicone surfactant composition according to the invention would comprise the following components in parts by weight (pbw) actives:

| Flexible Foam Formulation | pbw |
|---|---|
| Polyol | 20–100 |
| Polymer Polyol | 80–0 |
| Cell Stabilizer (invention) | 0.01–0.3; pref 0.05–0.15 |
| Silicone Cell Opener | 0–3 |
| Blowing Agent (Water) | 2–4.5 |
| Crosslinker | 0.5–2 |
| Catalyst Composition | 0.3–2 |
| Isocyanate Index | 70–115 |

In the present invention the preferred blowing agent for making the flexible molded foams is water at 1 to 6 parts per hundred parts polyol (pphpp), especially 2 to 4.5 pphpp, optionally with other blowing agents.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. In another embodiment the molded flexible foams can also be made by the "quasi-prepolymer process" as taught in U.S. Pat. Nos. 5,708,045 and 5,650,452 which are incorporated herein by reference. In either case, it is sometimes convenient to add the silicone surfactants (cell opener and cell stabilizer) to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and silicone surfactant cell stabilizer and cell opener are each present in a minor amount sufficient to foam the reaction mixture. The catalysts are present in a catalytic amount, i.e., that amount necessary to catalyze the reactions to produce the urethane and urea at a reasonable rate, and the surfactant of the invention is present in the amount sufficient to impart the properties desired and to stabilize the reacting foam, for example, 0.01 to 0.3 pphpp. These amounts are much less than those typically used for silicone polyether surfactants because of their surprising efficiency.

In a typical preparation, the polyol, water, silicone surfactants, amine catalyst, optional tin catalyst and optional other blowing agent are blended together and finally TDI is mixed in and the composition is allowed to foam and polymerize.

The invention has the following features:

The silicone polyether copolymer surfactants have unexpectedly high efficiency when the value of x+y is greater than 5 and less than or equal to 9 which allows a much lower use level than traditional high resiliency (HR) foam surfactants while not adversely affecting other properties. The lower use level is a benefit for formulation cost and foam emissions. A preferred structure is where x=y=3 with R having the structure

—CH$_2$CH$_2$CH$_2$(OCH(CH$_3$)CH$_2$)$_2$OCH$_3$.

The silicone surfactant can be blended with dimethylsilicone fluids, cell openers, other silicone polyether copolymers or diluents to provide further benefits and optimized performance.

EXAMPLE 1

The silicone polyether copolymer surfactants of Table 1B were prepared by reacting a trimethylsiloxy-endblocked polydimethylsiloxane-polymethylhydrogensiloxane copolymer having the formula Me$_3$Si(OSiMe$_2$)$_x$(OSiMeH)$_y$OSiMe$_3$ and an unsaturated polyether having the formula CH$_2$=CHCH$_2$[OCH(CH$_3$)CH$_2$]$_2$OCH$_3$ in the presence of a hydrosilylation catalyst according to the procedures disclosed in U.S. Pat. No. 4,031,044.

The silicone polyether copolymer surfactants were prepared in the following manner: a 3-necked round bottom flask was equipped with a reflux condenser, air powered mechanical stirrer, and a thermometer with thermowatch control. The thermometer well is fitted with a side arm gas inlet barb, which is fitted to a controlled nitrogen source. The trimethylsiloxy-endblocked polydimethylsiloxane-polymethylhydrogensiloxane copolymer described above (with the values of x and y described in Table 1B below) and the unsaturated polyether described above were loaded into the flask in the amounts described in Table 1A below and the atmosphere inerted with nitrogen. A small sweep of nitrogen is maintained over the mixture by monitoring bubbling of nitrogen gas out the top of the reflux condenser through dipropylene glycol. Rate is maintained at approximately 1 bubble per second. The mixture was then stirred and the mixture heated to 75° C. Next, the mixture was catalyzed with 31.86 microliters of catalyst made up as a 0.1M solution (0.5 g chloroplatinic acid/10 ml isopropyl alcohol (IPA)). The temperature was then maintained at peak exotherm (about 140–160° C.) for one hour. The resulting product was then cooled and then stripped by applying a vacuum of about 120 mm Hg at a temperature of about 100° C. and held for about 1 hour to remove the volatiles. The product was then allowed to cool and characterized by using FTIR, GPC, and viscosity. The silicone polyethers produced are described in Table 1B.

TABLE 1A

| Example | Siloxane (g) | Unsaturated Polyether (g) |
|---|---|---|
| A | 39.86 | 60.14 |
| B | 68.12 | 31.88 |
| C | 61.02 | 38.98 |
| D | 57.90 | 42.10 |
| E | 39.86 | 60.14 |
| F | 43.12 | 56.88 |
| H | 56.61 | 43.39 |
| 76E | 39.86 | 60.14 |
| 76K | 36.98 | 63.02 |
| X1 | 52.90 | 47.10 |

The silicone polyether copolymer surfactants of Table 1 B have the formula

Me$_3$Si(OSiMe$_2$)$_x$(OSiMeG)$_y$OSiMe$_3$ where G denotes the group —CH$_2$CH$_2$CH$_2$(OCH(CH$_3$)CH$_2$)$_2$OCH$_3$ and x and y are as defined in Table 1B below.

TABLE 1B

| Silicone Surfactant | x | y | x/y | x + y |
|---|---|---|---|---|
| A* | 1 | 1 | 1 | 2 |
| B | 1.5 | 0.5 | 3 | 2 |
| C** | 3 | 1 | 3 | 4 |
| D | 4.5 | 1.5 | 3 | 6 |
| E | 3 | 3 | 1 | 6 |
| F | 2 | 2 | 1 | 4 |
| G | 2.7 | 1.3 | 2.1 | 4 |
| H | 2 | 1 | 2 | 3 |
| 76E | 3 | 3 | 1 | 6 |
| 76K | 5 | 5 | 1 | 10 |
| X1 | 1.2 | 0.95 | 1.26 | 2.15 |

*Corresponds to surfactant (3) of Example 7 in U.S. Pat. No. 4,031,044
**Corresponds to surfactant (2) of Example 7 in U.S. Pat. No. 4,031,044

X1 is a silicone surfactant which is a prior art material according to U.S. Pat. No. 4,031,044 having the formula

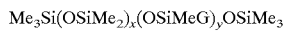

Me$_3$Si(OSiMe$_2$)$_x$(OSiMeG)$_y$OSiMe$_3$ wherein G denotes —CH$_2$CH$_2$CH$_2$(OCH(CH$_3$)CH$_2$)$_2$OCH$_3$ which surfactant is typically used in making HR flexible molded foams. In the Examples below, the silicone surfactants of Table 1 B were compared to the X1 silicone surfactant.

In the Examples and Tables the following materials were used:

Arcol E 519 SAN polyol from Lyondell (OH#=24.4)
Arcol E 648 polyether polyol from Lyondell (OH#=35)
Arcol E 848 polyether polyol from Lyondell (OH#=31.5)
Arcol E 851 SAN polyol from Lyondell (OH#=18.5)
DABCO 33LV® catalyst from Air Products and Chemicals, Inc. (APCI)
DABCO® BL-11 catalyst from APCI
DABCO BL-17 catalyst from APCI
DABCO™ DEOA-LF—diethanolamine/water (85/15) from APCI
F11630 dimethylsilicone fluid from Dow Corning
Cell Opener A—silicone surfactant taught in U.S. Pat. No. 5,852,065
POLYCAT® 77 catalyst from APCI.
PRC-798 solvent-based release agent from ChemTrend
TDI 80/20 from Bayer
Texanol diluent from Eastman Chemical Table 1C presents the HR flexible foam formulations A–C used in the examples with the components in active parts by weight (pbw).

TABLE 1C

| FORMULATION | A | B | C |
|---|---|---|---|
| Arcol E-519 | 50 | 85 | |
| Arcol E-648 | 50 | 15 | |
| Arcol E-848 | | | 90 |
| Arcol E-851 | | | 10 |
| Water | 3.35 | 3.8 | 3.8 |
| Dabco 33LV | 0.5 | 0.15 | 0.3 |
| Dabco BL17 | 0.19 | 0.2 | |
| Dabco BL11 | | | 0.08 |
| Polycat 77 | 1.65 | 0.15 | |
| Dabco DEOA-LF | 1.65 | 1.3 | 1.4 |
| TDI 80/20 | 100 Index | 100 Index | 100 Index |

EXAMPLE 2

In this Example TDI flexible molded polyurethane foam was prepared using Foam Formulation A. Run 1 used X1 silicone polyether copolymer surfactant and Runs 2–5 used silicone surfactant E.

Machine runs were performed on a Hi-Tech high pressure foam machine. The resin "B side" components were mixed and placed in a 5.5 gallon (20.8 L) tank which was agitated and maintained at 72° F. (22° C.) under 2.2 bar of nitrogen pressure. The TDI "A side" component was also contained in a 5.5 gallon (20.8 L) tank which was agitated and maintained at 72° F. (22° C.) at 2.2 bar of nitrogen pressure. Before a shot was made into a mold, material was first circulated through the lines and mixhead and back to the tanks to provide a uniform temperature throughout the mixing line. During the shot, hydraulic pistons were raised which allowed the resin and TDI components to mix via high pressure impingement mixing. The material from the mixhead was directed into a mold to produce a flexible molded pad. Molds were maintained at 155° F. (68° C.) via a hot water circulation system incorporated into the mold design. Results in Table 2 show the higher efficiency of a silicone surfactant having an x+y>5.

TABLE 2

| Run | 1 | 2 | 3 | 4 | 5 |
|---|---|---|---|---|---|
| Silicone Surfactant (pbw)* | X1 0.45 | E 0.075 | E 0.075 | E 0.1 | E 0.133 |
| Cell Opener A (pbw) | None | None | .25 | None | None |
| Pad Density | 2.14 | 2.17 | 2.15 | 2.22 | 2.19 |
| Airflow | 1.73 | 1.72 | 1.76 | 1.24 | 1.05 |
| 25% ILD | 24 | 24 | 25 | 24 | 21 |
| 50% Compression | 5.18 | 5.97 | 3.74 | 11.9 | 14.1 |
| 50% Humid Comp. | 28.50 | 27.93 | 24.63 | 29.9 | 28.9 |
| Jap. Wet Set | 32.2 | 35.63 | 24.99 | 36 | 41.4 |
| Ball Rebound | 40 | 37 | 45 | 36 | 37 |
| % Shrinkage | 23 | 38 | 7 | 38 | 75 |
| Uncrushed pad Initial Force to Crush (lb; N) | 108; 484 | 136; 609 | 63; 282 | 175; 784 | 217; 972 |

*Actives

Table 2 shows that Silicone Surfactant E (Run 2) provided similar foam properties to conventional surfactant X1 for HR molded foam at a significantly lower use level. This lower use level provides a benefit in system cost and lower emissions. Furthermore, combination of Silicone Surfactant E with Cell Opener A surfactant in Run 3 reduced shrinkage. Silicone Surfactant E was so efficient that, when its use level was increased to approach that of the conventional surfactant, the foam became undesirable because of very closed cell and shrinkage and dimensional stability of the foam as shown in Run 5.

EXAMPLE 3

This example demonstrates that values of x+y>5 provided surfactants that allowed lower use levels.

The polyols listed in the Formulation B were combined ahead of time and stored in a container that was incubated at 70–73° F. (21–23° C.). A separate mixture of water, cross-linker, and amine catalyst was also prepared. A foam was typically created by first mixing the polyol and surfactant in a ½ gallon (1890 ml) paper cup for 20 sec at 6000 rpm using a Servodyne dispersator with a 3 inch (7.6 cm) disc mixing blade. The water-amine blend was then introduced into the same paper cup and mixed for an additional 20 sec at 6000 rpm. Next, the TDI was added to the paper cup and mixed for 5 sec. Finally, the entire cup contents were poured for 5 sec into a 155° F. (68° C.) five vent aluminum mold having the dimensions of 8×9×4.5 inch (20.3×22.9×11.4 cm), pretreated with PRC-798 release agent. The mold was immediately closed. After 330 seconds the foam pad was removed from the mold and crushed by hand using a metal plate for vent and surface observations only. Cured foams were later cut into one inch (2.54 cm) slices for observation of bulk, vent, and surface stability. Stability measurements were rated by matching foams against internal standards. In this example, the surface stability rating was 1 to 10 with 10 being the best. The vent rating was 1 to 4 with 1 being the best.

The use level of each surfactant was varied until a good foam was produced in both surface stability and vent stability. The use levels are shown in Table 3. In general, the lowest acceptable use levels could be obtained when x+y>5.

TABLE 3

| Surfactant | x/y | x + y | Use level (pphpp)** | Surface Stability | Vent Stability |
|---|---|---|---|---|---|
| X1 | | | 0.15 | 1 | 4 |
| | | | 0.29 | 3 | 4 |
| | | | 0.44 | 8 | 2 |
| | | | 0.58 | 9 | 1 |
| A | 1 | 2 | 0.2 | 2 | 2 |
| | | | 0.3 | 5 | 2 |
| | | | 0.4 | 8 | 2 |
| | | | 0.5 | 9 | 2 |
| B | 3 | 2 | 0.1 | 2 | 4 |
| | | | 0.2 | 7 | 3 |
| | | | 0.3 | 9 | 2 |
| C | 3 | 4 | 0.03 | 2 | 4 |
| | | | 0.05 | 7 | 3 |
| | | | 0.1 | 9 | 1 |
| D | 3 | 6 | 0.03 | 6 | 2 |
| | | | 0.05 | 6 | 4 |
| | | | 0.1 | 9 | 1 |
| E | 1 | 6 | 0.03 | 5 | 3 |
| | | | 0.05 | 7 | 1 |
| | | | 0.1 | 9 | 1 |
| F | 1 | 4 | 0.05 | 3 | 4 |
| | | | 0.1 | 8 | 2 |
| | | | 0.2 | 9 | 1 |
| G | 2 | 4 | 0.03 | 1 | 4 |
| | | | 0.05 | 6 | 4 |
| | | | 0.1 | 9 | 1 |
| H | 2 | 3 | 0.05 | 1 | 4 |
| | | | 0.1 | 8 | 4 |
| | | | 0.2 | 9 | 1 |

**pphpp — active parts per hundred parts polyol

EXAMPLE 4

In this Example the silicone surfactants were blended with F11630 dimethylsilicone fluid using Formulation B. The procedure of Example 3 was followed. Silicone surfactants C–H in this example were blended at 5% silicone surfactant (actives) with 5% F11630 dimethylsilicone fluid and 90% Texanol. Table 4 shows improved surface stability and vent stability were obtained using the silicone surfactants according to the invention in combination with the dimethylsilicone fluid at lower use levels.

TABLE 4

| Surfactant | x/y | x + y | Use level (pphpp)* | Surface Stability | Vent Stability |
|---|---|---|---|---|---|
| X1 | | | 0.58 | 9 | 1 |
| | | | 0.44 | 8 | 2 |
| | | | 0.29 | 6 | 3 |
| | | | 0.23 | 6 | 4 |
| C | 3 | 4 | 0.075 | 10 | 1 |
| | | | 0.05 | 10 | 1 |
| | | | 0.04 | 9 | 2 |
| | | | 0.03 | 6 | 3 |
| D | 3 | 6 | 0.075 | 10 | 1 |
| | | | 0.04 | 10 | 1 |
| | | | 0.03 | 9 | 1 |
| | | | 0.025 | 9 | 2 |
| E | 1 | 6 | 0.05 | 10 | 1 |
| | | | 0.04 | 10 | 1 |
| | | | 0.03 | 10 | 1 |
| | | | 0.025 | 9 | 2 |
| F | 1 | 4 | 0.075 | 10 | 1 |
| | | | 0.05 | 10 | 1 |
| | | | 0.04 | 10 | 2 |
| | | | 0.03 | 9 | 3 |
| G | 2 | 4 | 0.05 | 10 | 2 |
| | | | 0.04 | 10 | 2 |
| | | | 0.03 | 10 | 3 |
| | | | 0.025 | 9 | 4 |
| H | 2 | 3 | 0.075 | 10 | 2 |
| | | | 0.05 | 9 | 3 |
| | | | 0.04 | 8 | 4 |
| | | | 0.03 | 6 | 4 |

*Actives

EXAMPLE 5

In this Example Formulation B was used and the procedure of Example 3 was followed. All silicone surfactants in this example were diluted to 20% actives in Texanol solvent. For surface stability ratings, 5 is the best. For vent stability ratings, 1 is the best. Table 5 shows a silicone surfactant with an x+y of 10 with an x/y=1 was too efficient and caused shrinkage.

TABLE 5

| Surfactant | x/y | x + y | Use level (pphpp)* | Surface Stability | Vent Stability | Shrinkage Comments |
|---|---|---|---|---|---|---|
| X1 | 1.26 | 2.15 | 0.2 | 3 | 3 | none |
| | | | 0.25 | 4 | 3 | none |
| | | | 0.3 | 5 | 3 | none |
| | | | 0.4 | 5 | 1 | none |
| | | | 0.5 | 5 | 1 | none |
| 76E | 1 | 6 | 0.02 | 2 | 3 | slight |
| | | | 0.04 | 4 | 2 | slight |
| | | | 0.06 | 5 | 1 | moderate |
| | | | 0.08 | 5 | 1 | moderate |
| 76K | 1 | 10 | 0.02 | 3 | 3 | moderate |
| | | | 0.04 | 5 | 1 | severe |
| | | | 0.06 | 5 | 1 | severe |

*Actives

Surfactant 76K showed an x+y value of 10 was too high to provide a foam without severe shrinkage.

EXAMPLE 6

Runs 11–17 were performed following the procedure of Example 1 using Formulation C and a demold time of 5 min. Results are shown in Table 6.

TABLE 6

| Run | 11 | 12 | 13 | 14 | 15 | 16 | 17 |
|---|---|---|---|---|---|---|---|
| X1* | 0.29 | 0 | 0 | 0 | 0 | 0 | 0 |
| F11630** | 0 | 0 | 0 | 0.02 | 0.02 | 0.02 | 0.02 |
| E* | 0 | 0.05 | 0.05 | 0.05 | 0.03 | 0.05 | 0.07 |
| Cell Rating vs X1 | Control | worse | worse | better | equal | better | slightly better |
| FTC*** (lb; N) | 170; 762 | 190; 851 | 218; 977 | 165; 739 | 162; 726 | 172; 771 | 178; 797 |
|  | 140; 627 | 160; 717 | 212; 950 | 132; 591 | 132; 591 | 142; 636 | 150; 672 |
|  | 120; 538 | 145; 650 | 208; 932 | 120; 538 | 118; 529 | 128; 573 | 133; 596 |
| Sub-surface | no voids | voiding | voiding | no voids | no voids | no voids | no voids |

*Actives pphpp
**pphpp
***Force-to-crush (first three values)

Runs 14–17 show that combined use of Silicone Surfactant E with F11630 polydimethylsiloxane fluid produced a foam with excellent surface/subsurface characteristics and ultimately lower FTC values which are indicative of a more open foam. Surface quality was at least equivalent to foam made using X1, however the foam was more open. Cell structure ratings of Runs 14–17 were equal to or better than the control.

We claim:

1. A method for preparing a polyurethane flexible molded foam which comprises reacting an organic polyisocyanate with a polyol in the presence of urethane catalyst, water as a blowing agent, optionally a cell opener, and a silicone surfactant cell stabilizer having the formula:

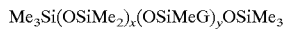

$Me_3Si(OSiMe_2)_x(OSiMeG)_yOSiMe_3$ wherein x has an average value from 1 to 4.5 and y has an average value from 0.75 to 7.5, the value of x/y is from 0.25 to 5 and the value of x+y is from greater than 5 to 9, G is a group having the formula —D(OR")$_m$A where D is a divalent organic linking radical, R" is an alkylene group, m has an average value from 1 to 5, and A denotes an —OR'" or an —OOCR'" group, where R'" is selected from the group consisting of methyl, ethyl, and a combination of methyl and ethyl.

2. The method of claim 1 in which x/y is 0.5 to 2 and x+y is 5.5 to 7.

3. The method of claim 1 in which m is 2 to 3.

4. The method of claim 1 in which D is a C3–C5 alkylene radical.

5. The method of claim 3 in which R" is propylene.

6. The method of claim 1 in which x/y is 1 and x+y is 6.

7. The method of claim 6 in which G has the structure —CH$_2$CH$_2$CH$_2$(OCH(CH$_3$)CH$_2$)$_2$OCH$_3$.

8. The method of claim 7 in which x/y is 1 and x+y is 6.

9. The method of claim 1 in which the silicone surfactant cell stabilizer is used in an amount of 0.01 to 0.3 parts per hundred parts polyol.

10. The method of claim 1 in which x and y have average values such that x/y is 0.5 to 2 and x+y is 5.5 to 7, D is a C3–C5 alkylene radical, R" is propylene, m has an average value from 2 to 3 and A is an —OR'" or an —OOCR'" group, where R'" is methyl and/or ethyl.

11. The method of claim 1 in which x and y are 3, D is a propylene radical, R" is propylene, m has an average value of 2 and A is —OCH3.

12. A polyurethane flexible molded foam composition prepared by mixing the following components in parts by weight (pbw):

|  | (pbw) |
|---|---|
| Polyol | 20–100 |
| Polymer Polyol | 80–0 |
| Silicone Surfactant Cell Stabilizer | 0.01–0.3 |
| Silicone Cell Opener | 0–3 |
| Water | 1–8 |
| Auxiliary Blowing Agent | 0–20 |
| Urethane Catalyst | 0.3–3 |
| Isocyanate Index | 70–115 | in which the silicone surfactant cell stabilizer is a compound having the formula:

$Me_3Si(OSiMe_2)_x(OSiMeG)_yOSiMe_3$ wherein x has an average value from 1 to 4.5 and y has an average value from 0.75 to 7.5, the value of x/y is from 0.25 to 5 and the value of x+y is from greater than 5 to 9, G is a group having the formula —D(OR")$_m$A where D is a divalent organic linking radical, R" is an alkylene group, m has an average value from 1 to 5, and A denotes an —OR'" or an —OOCR'" group, where R'" is selected from the group consisting of methyl, ethyl, and a combination of methyl and ethyl.

13. The foam composition of claim 12 in which x/y is 0.5 to 2 and x+y is 5.5 to 7.

14. The foam composition of claim 12 in which m is 2 to 3.

15. The foam composition of claim 12 in which D is C3–C5 alkylene radical.

16. The foam composition of claim 12 in which R" is propylene.

17. The foam composition of claim 12 in which x/y is 1 and x+y is 6.

18. The foam composition of claim 17 in which G has the structure —CH$_2$CH$_2$CH$_2$(OCH(CH$_3$)CH$_2$)$_2$OCH$_3$.

19. The foam composition of claim 18 in which x/y is 1 and x+y is 6.

20. The foam composition of claim 12 in which x and y have average values such that x/y is 0.5 to 2 and x+y is 5.5 to 7, D is a C3–C5 alkylene radical, R" is a propylene, m has an average value from 2 to 3 and A is an —OR'" or an —OOCR'" group, where R'" is methyl and/or ethyl.

21. The foam composition of claim 12 in which x and y are 3, D is a propylene radical, R" is propylene, m has an average value of 2 and A is —OCH3.

22. The method of claim 1 in which the silicone surfactant cell stabilizer is used in combination with a polydimethylsiloxane fluid.

23. The foam composition of claim 12 in which the silicone surfactant cell stabilizer is used in combination with a polydimethylsiloxane fluid.

* * * * *